United States Patent [19]

Shapard et al.

[11] Patent Number: 5,892,765
[45] Date of Patent: Apr. 6, 1999

[54] SYSTEM AND METHOD FOR EFFECTUATING COMMUNICATIONS BETWEEN NETWORKS OPERATING ASYNCHRONOUSLY WITH RESPECT TO ONE ANOTHER

[75] Inventors: Thomas D. Shapard; Merle J. Zacharias, both of San Diego; Michael W. DaBose, Escondido; David Duke; Roger Uzun, both of San Diego, all of Calif.

[73] Assignee: The United States of America as represented by the Secretary of the Navy, Washington, D.C.

[21] Appl. No.: 749,594

[22] Filed: Nov. 15, 1996

[51] Int. Cl.[6] .................................................. H04L 12/46
[52] U.S. Cl. ............................. 370/401; 370/508
[58] Field of Search .................................... 370/401, 402, 370/508; 455/11.1

[56] References Cited

U.S. PATENT DOCUMENTS

| | | | |
|---|---|---|---|
| 4,943,978 | 7/1990 | Rice | 375/1 |
| 5,583,997 | 12/1996 | Hart | 395/200.15 |

OTHER PUBLICATIONS

Uyless Black, "OSI: A Model for Computer Communications Standards", Prentice–Hall, Inc., pp. 222–223, 1991.
George E, Mitchell et al., "Impact of Time Delays on the JTIDS Network," Proceedings of the IEEE 1990 National Aerospace and Electronics Conference (Cat. No. 90CH2881–1), vol. 1, pp. 440–445, May 1990.

*Primary Examiner*—Melvin Marcelo
*Attorney, Agent, or Firm*—Harvey Fendelman; Peter A. Lipovsky; Michael A. Kagan

[57] ABSTRACT

The invention provides a computer implemented system comprised of two computer terminals for effectuating bidirectional digital, time synchronized communications between networks operating asynchronously with respect to one another. The system repackages the data field of a message received from a network into a message that further includes time indicia corresponding to a time slot in which the repackaged message is to be transmitted so that it may be received by a second network. The repackaged message then is buffered until it is transmitted in the the appropriate time slot so that it may be detected by the second network. The invention overcomes the problem of effectuating communications between distant networks where the message propagation time and time slot period for receiving messages limits the range of communications.

10 Claims, 7 Drawing Sheets

Terminal Output Messages
(Msg's received network 40)

| | |
|---|---|
| Number 16 bit words in the message data | 20-1 |
| Message type (FF, Free Text Uncoded, Free Text Coded) | 20-2 |
| STN | 20-3 |
| NPG the message received on | 20-4 |
| message data | |

Figure 5

Terminal Input Message
(Msg's Transmitted Network 46) 26

| |
|---|
| message type I    26-1 |
| Length I          26-2 |
| NPG I             26-3 |
| Specific Slot I   26-4 |
| STN I             26-5 |
| message data |

Figure 7

SYSTEM AND METHOD FOR EFFECTUATING COMMUNICATIONS BETWEEN NETWORKS OPERATING ASYNCHRONOUSLY WITH RESPECT TO ONE ANOTHER

FIELD OF INVENTION

The present invention relates to a data communications system, and more particularly, to a communications system interface which facilitates data communications between networks operating asynchronously with respect to one another.

BACKGROUND OF THE INVENTION

The Joint Tactical Information Distribution System (JTIDS) provides a secure, jam-resistance digital communication system for data and voice. JTIDS is a Time Division Multiple Access (TDMA) communication system operating at L-band frequencies. It supports the positive identification and precise location of all participating platforms, such as ships, aircraft, shore station facilities and the like. JTIDS is currently implemented by the United States Navy, the Joint Services, and forces of the North Atlantic Treaty Organization (NATO). The primary function of JTIDS within the Navy is to distribute tactical information in digital form to Navy tactical users such as ships and aircraft. JTIDS technology also locates and identifies subscribers with high precision.

JTIDS transmissions occure in time slots each consisting of a pulse train organized into a symbol signal structure, as shown in FIG. 1. Each symbol conveys five bits, in either one or two 6.4-$\mu$sec pulses, in a 13-$\mu$sec or 26-$\mu$sec symbol, respectively. The five bits of each pulse are represented by a 32-chip code pattern obtained from cyclic shifts of a fixed 32-bit pattern. Frequency hopping and other spread spectrum techniques make JTIDS communications highly resistant to jamming, and data encryption makes it secure. As a digital system for both data and voice, JTIDS can handle large amounts of data. JTIDS transmits a frequency-hopping transmission pattern using 51 frequencies at 3-MHZ intervals, spread over the 969-1206 MHZ band, excluding two Identification Friend or Foe (IFF) subbands. JTIDS is also a multiple access system based on serially repeating, periodic epochs each comprised of a fixed number of assigned time slots during which messages may be received or transmitted. By the JTIDS standard, each time slot is $1/128$ seconds (7.8125 msec) in duration. A frame is made up of 1,536 slots (12 seconds). An epoch is divided into 64 frames lasting 12.8 minutes. There are 128 separate nets, each having 98K time slots per epoch. A designated terminal, acting as a net time reference, causes the time slots in each net to coincide exactly. Thus, JTIDS may be more generally classified as a time division based system because messages can only be received or transmitted in predetermined time slots. For example, if a message reaches a JTIDS terminal outside a time slot designated as a "receiving time slot," the message will not be received.

A JTIDS system normally supports communications within an RF line-of-sight distance or approximately 500 nautical mile radius for an airborne based system. This distance limitation results from the fact that time division multiplexing requires that each time slot have sufficient null time to allow communications packets to be received before the beginning of the next time slot. Therefore, if the propagation path of the messages is great enough, the propagation time of the message causes the message to arrive at its destination Link-16 terminal across time slots or in the wrong time slot. In both cases, the message is not received.

In the past, training, integration testing, inter-operability testing, development testing, modeling, and simulation efforts for JTIDS communications system required that Link-16 terminals from many different platforms, as for example, ships and aircraft, be brought to one central location so they would be within the RF line-of-sight limit. However, such relocation was expensive and time consuming. Hence, very limited testing and training has been accomplished with the present JTIDS systems.

A need therefore exists for a way to communicatively couple time division based (TDB) networks which may be separated so far from each other that by the time a message transmitted by one network reaches a second network, the second network can no longer receive the message because the time slot in which the message can be received has timed out.

SUMMARY OF THE INVENTION

The invention provides a computer implemented system comprised of two computer terminals for effectuating bidirectional digital communications between time division based (TDB) networks operating asynchronously with respect to one another. The invention repackages the data field of a message received from a network into a message that further includes time indicia corresponding to a time slot in which the repackaged message is to be transmitted. The repackaged message then is buffered until being transmitted in the appropriate time slot so that it may be detected by the second network. The invention overcomes the problem of effectuating communications between distant networks where the message propagation time and time slot period for receiving messages limits the range of communications.

These and other advantages of the present invention will become more evident upon review of the accompanying drawings, and specification, including the claims.

BRIEF DESCRIPTION OF THE DRAWINGS

FIG. 5 shows the format of a terminal output message.

FIG. 7 shows the format of a terminal input message which is to be directed to a TDB network during an appropriated time slot.

Throughout the figures, like elements are referenced using like references.

DESCRIPTION OF THE PREFERRED EMBODIMENTS

Figure 1:
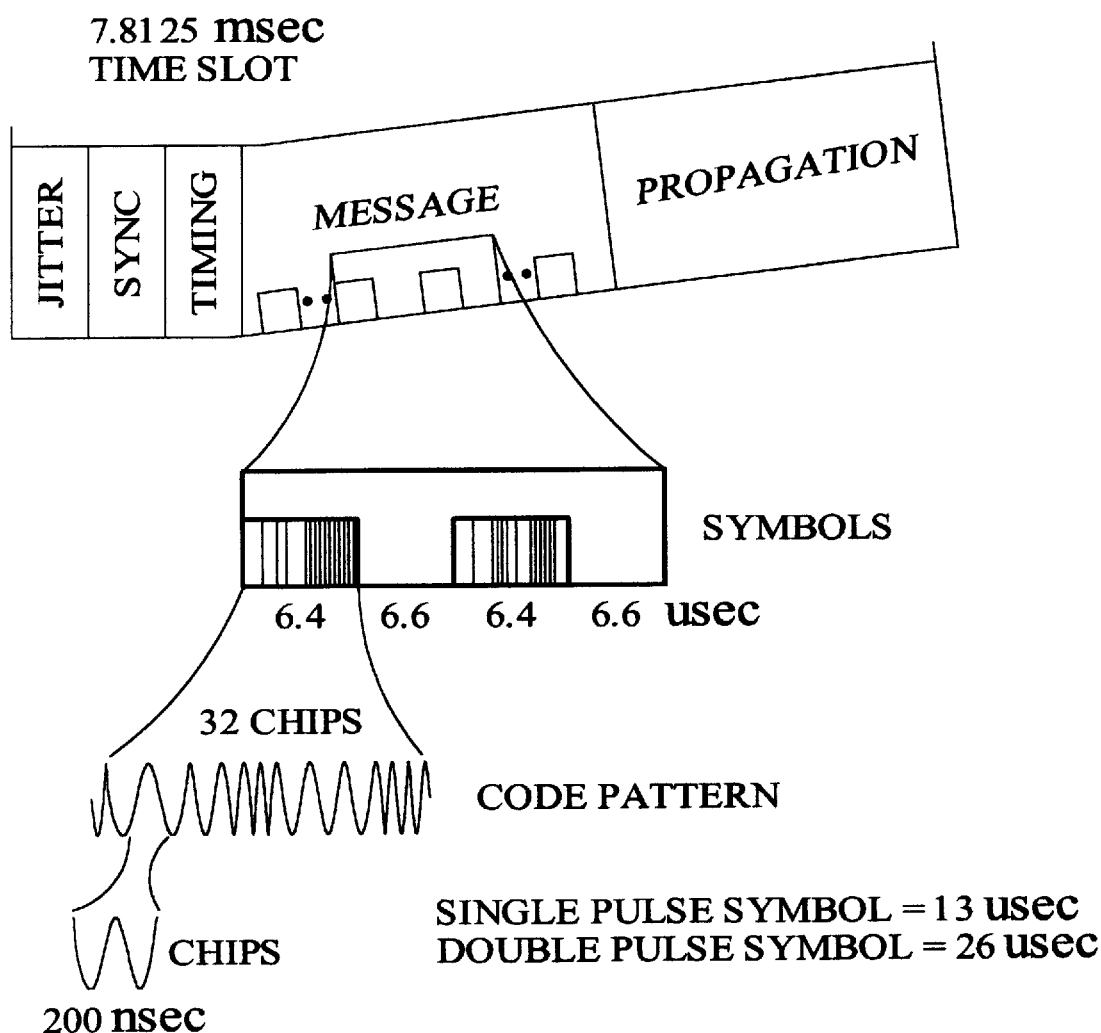
FIG. 1 shows a JTIDS transmission in a time slot consisting of a pulse train organized into a symbol signal structure.
Figure 2:
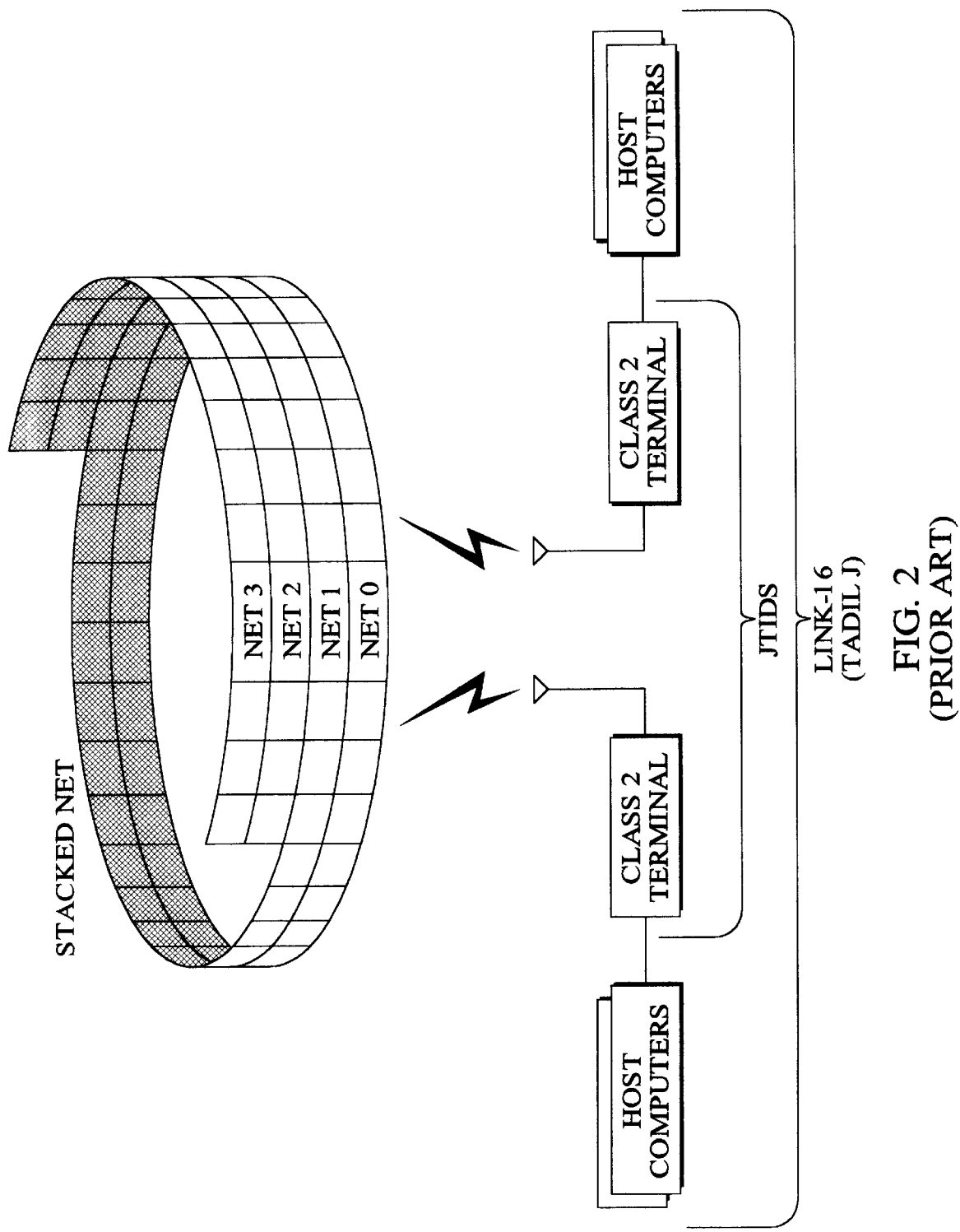
FIG. 2 shows two JTIDS Link-16 nodes, each comprising a host computer and a Class 2 terminal, which communicate via a stacked net RF link.
Figure 3:
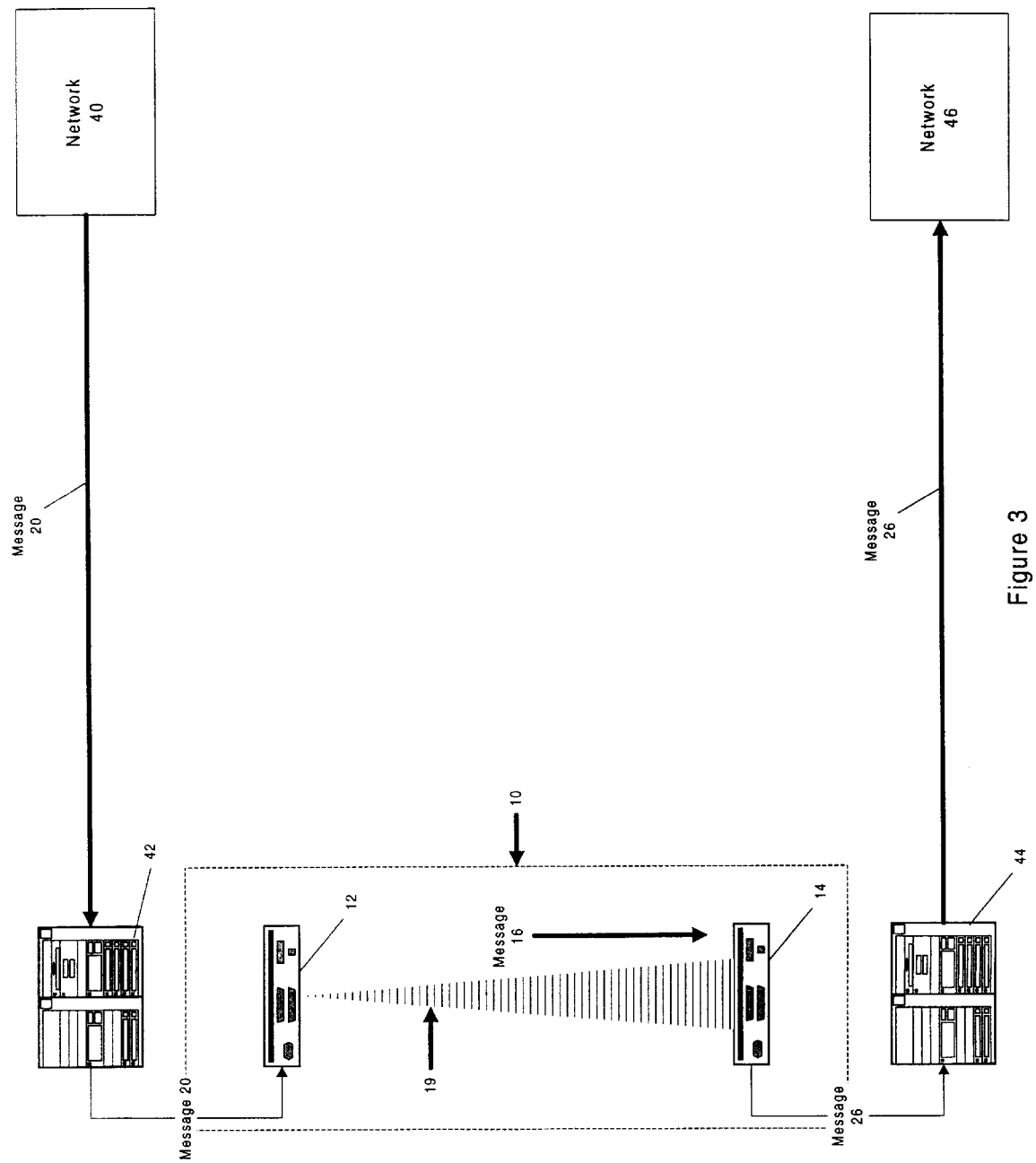
FIG. 3 shows a system for effectuating communications between TDB networks operating asynchronously with respect to one another that embodies various features of the present invention.

The invention, described with reference to FIG. 3, provides a computer implemented system 10 and method for effectuating bidirectional digital communications between TDB networks 40 and 46 operating asynchronously with respect to one another. For purposes of illustration, the invention is described as providing an interface between two networks. However, it is to be understood that the invention may be employed to communicatively link any number of TDB networks required to suit the requirments of a particular application. The system 10 provides an interface that allows the information encoded in a Terminal Output Messages (TOM) 20 generated by a network 40 operating at a first time base to be encoded in a terminal input message (TIM) 26 so that it may be transmitted in an appropriate time slot to a second network 46 operating at a second time base.

System 10 includes a terminal 12 which receives the message 20 from the network 40 via a receiver 42, and a second terminal 14 which provides the message 26 to a transmitter 44 coupled to the network 46. By way of example, the receiver 42 and transmitter 44 each may be implemented as tranceivers 42 and 44, respectively. The system 10 uses time indicia included in message 20, the propagation time of a sychronization message 21 transmitted by terminal 12 to terminal 14, and predefined network parameters for network 46 that are provided to terminal 14 to determine the next appropriate time slot during which message 26 is to be transmitted by transmitter 44 so that it may be received by network 46. The terminal 14 constructs message 26 to include such time slot information and provides terminal output message 26 to transmitter 44. Transmitter 44 buffers message 26 and transmits it to the network 46 during the next appropriate time slot. The phrase "appropriate time slot" refers to a time interval during which message 26 may be received by network 46 after being transmitted by transmitter 44 during that same time interval. The system 10 overcomes the line of sight distance limitations inherent in communications between time division based networks by encoding information in terminal output message 26 which indicates the appropriate time slot in which message 26 is to be transmitted so that it may be received by network 46. Transmission of message 26 in the appropriate time slot avoids a time out condition that would otherwise prevent the TIM 26 from being received by destination TDB network 46.

Referring still to FIG. 3, terminals 12 and 14 may each be implemented as PC type Pentium™-based computers preferably having a clock speed of at least 166 MHZ. The terminals 12 and 14 are communicatively linked to each other by any suitable digital data propagation medium 19, such as optical fibers, RF path, telephone line, electrical wires, satellite relay system, and the like, so long as the transmission medium is sufficient to handle the traffic load.

In the operation of system 10, a message 20 is received and reformatted into message 16 by terminal 12 for transmission to terminal 14. Message 16 includes network specific information such as the arrival time of message 20 at terminal 12 based on network 40 reference time, and the address of the terminal 12 which is used by terminal 14 to determine new network parameters that indicate the next appropriate time slot during which message 26 is to be transmitted to network 46. Such network specific information is not included in message 20. By way of example, transceivers 42 and 44 may be JTIDS terminals, or other types of communications systems capable of transmitting and receiving digital messages. Terminals 12 and 14 may generally be connected to different TBD networks operating on their own respective time bases, or internal clock references, which are not necessarily synchronized with each other. System 10 overcomes the problem of lack of time synchronization between networks 40 and 46 due to distance limitations imposed by the propagation speed of the message, generally the speed of light, whether such messages are transmitted, for example, via optical fibers, RF links, or telephone lines. The problem arises when the time required for a message to traverse the distance between any two transceivers causes the message to reach its detination outside of a time slot designated by the control system of the destination network for receiving messages.

System 10 facilitates bidirectional communications between networks 40 and 46 which each are time synchronized digital, TBD networks having fixed time slot intervals during which messages may be transmitted or received by a particular network. It is to be understood that TBD networks 40 and 46 may operate on different time bases, $T_{40}$ and $T_{46}$, respectively. Although the time slot intervals of networks 40 and 46 may or may not have the same period, the time slots are not generally coincident.

For example, assume: 1) terminal 12 is connected through receiver 42 to network 40 operating on a first time base, where the current reference time, $T_{40}$ may be 15:23:01.5678; 2) terminal 14 is connected through transmitter 44 to network 46 operating on a second time base where the current reference time, $T_{46}$, of network 46 may be 08:12:14.1234; and 3) the propagation time $T_{prop}$ for the synchronization message 21 to propagate from terminal 12 to terminal 14, by way of example only, may be 1.5200 milliseconds, where $T_{40}$ and $T_{46}$ are contemporaneous with respect to each other. The network time differential, $T_{Diff}$, between networks 46 and 40, may be determined as follows:

$$T_{Diff} = T_{46} - T_{40} + T_{prop}$$

$T_{Diff}$=15:23:01.5678−08:12:14.1234+1.5200 milliseconds, so that $T_{Diff}$=07:10:47.44592. However, the propagation time $T_{prop}$ may vary over time, depending upon the load factors of system 10. The network time differential $T_{Diff}$ is used by terminal 14 to determine the transmission time slot assignment for message 26. Terminal 14 informs transmitter 44, by way of data encoded in message 26, of the appropriate time slot in which to transmit message 26 in a time slot designated by network 46 for receiving messages. The benefit of transmitting message 26 in the appropriate time slot allows information to be communicated between time synchronized digital networks lying beyond the normal synchronized communications range. For example, if networks 40 and 46 lie beyond the synchronized communications range, determined by the speed of light and the length in time of a transmission/reception time slot, message 20 could not be received by network 46 because it would not be received in an appropriate time slot. The value of $T_{Diff}$ may be either a positive or negative number, depending the offset between the time bases for each of networks 40 and 46.

Figure 4:
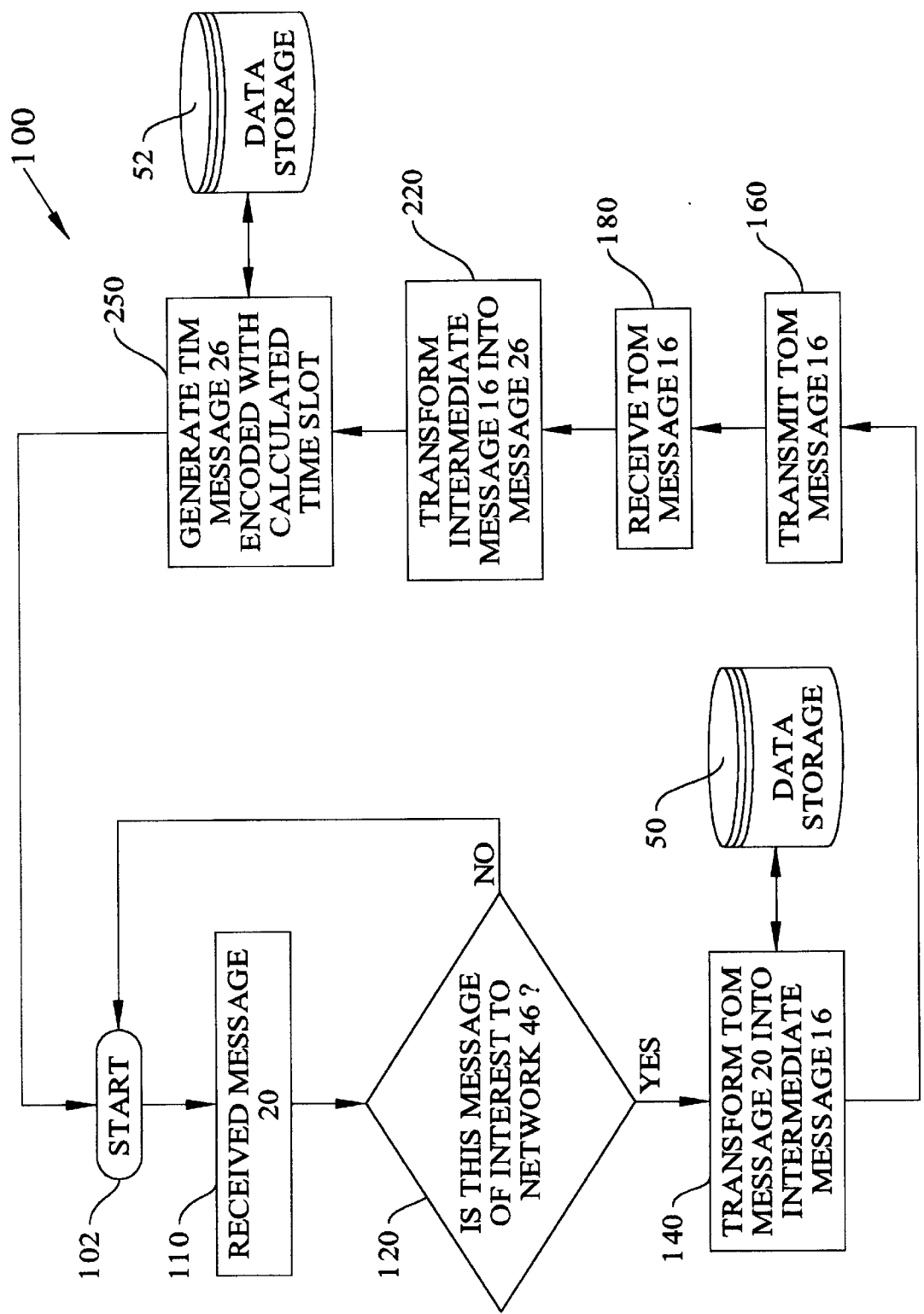
FIG. 4 is a flow chart illustrating the operation of the system illustrated in FIG. 3.

FIG. 4 illustrates process 100 implemented by system 10 in a flowchart format. Starting at step 102, the process 100 proceeds to step 110 where message 20 is received by terminal 12 from receiver 42. Then at step 120, a determination is made as to whether the message 20 is of interest to network 46. If the determination at step 120 is NO, then program 100 returns to step 110. If the determination at step 120 is YES, then at step 140 message 20 is transformed by terminal 12 into message 16 having a standardized format allowing terminals 12, 14, and other terminals, not shown, to communicate with one another. For example, message 16 may have a format defined in "Gateway Software Development Plan," Document Number L16GW-CC-SDR-U-ROCO, a Time Division Multiple Access Format (TDMA), or suitable for digital video broadcasts enabling exact transmission reconstruction (CD quality). However, it is to be understood that other formats suited to the requirements of a particular application may also be employed.

By way of example, message 20 may be formatted as shown in FIG. 5, to include headers 20-1 through 20-4, described as follows: The contents of header 20-1 represent a the number of n-bit words in the body (message data) of message 20, where n is a positive integer. The contents of header 20-2 represent the message type, such as text, binary, or mixed mode, i.e., the data format of the message data of message 20. The contents of header 20-3 represent an individual item correlator between networks such networks 40 and 46. The "individual item correlator" cardinally relates unique identifiers on each of networks 40 and 46 that refer to the same item. For example, network 40 may refer to a particular data set as DATA SET 5, whereas network 46 may refer to that same data set as DATA SET 7. The contents of header 20-4 represent an address for a network group such as network 40 that may be referenced by network 46 using another address. For example, assume a network 40 group is monitoring air traffic at San Diego Lindbergh Field in San Diego, California. That particular network 40 group may be referenced as "network 40 group AA" by network 40 and as "network 46 group BB" by network 46. The addresses for network groups are defined in the network configuration of each network.

At step 140, message 20 (FIG. 4) is transformed by terminal 12 into message 16 having a format which enables it to be transmitted to terminal 14. Message 20 is assigned an address directing message 16 to terminal 14, or to any other terminal(s) (not shown) to which the message 16 is to be directed based on predetermined configuration criteria for system 10 which are provided to terminals 12 and 14 by data storage devices 50 and 52, respectively. Data storage device 50 may also be employed to store message 16 for retransmission in case remote terminal 14 does not acknowledge receipt of message 16.

Figure 6:
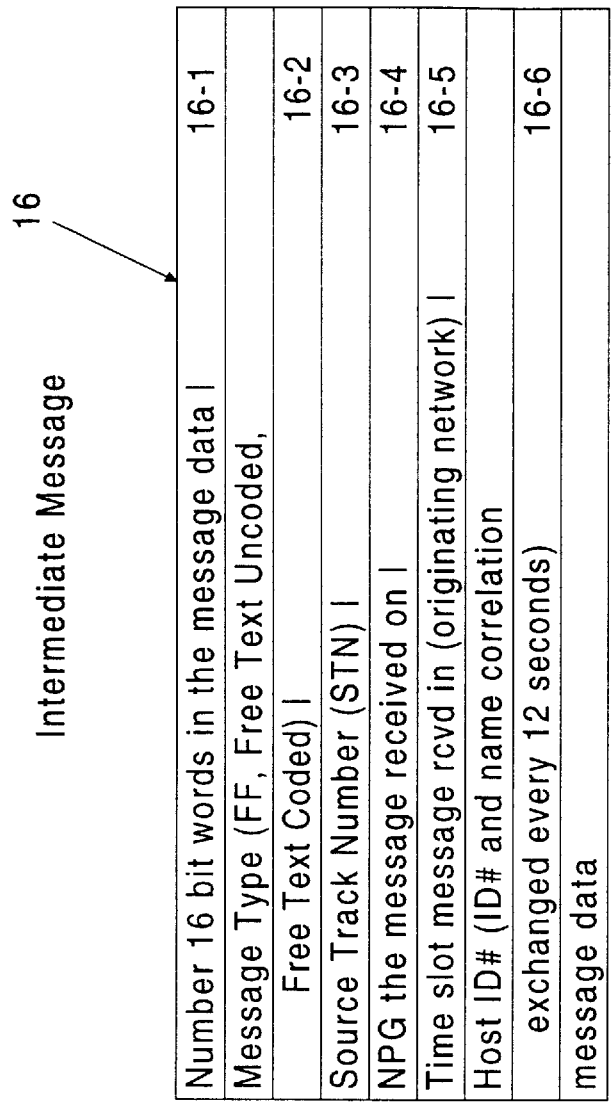
FIG. 6 shows the format of an intermediate message which is directed between the terminals shown in FIG. 3.

FIG. 6, shows, by way of example, the format of message 16. Message 16 includes headers 16-1 through 16-6. The contents of header 16-1 represent the number of n-bit words in the body (message data) of message 16, where n is a positive integer. The contents of header 16-2 represent the message type, such as text, binary, or mixed mode, i.e., the data format of the message data. The contents of header 16-3 represent an individual item correlator of network 40 which is translated by terminal 14 to a discrete network 46 correlator. The contents of header 16-4 represent a network participation group of network 40 which is translated by terminal 14 to a network participation group for network 46. The contents of header 16-5 represent the time slot in which message 20 is received by terminal 12. The contents of header 16-6 include the unique address of terminal 12 and the time at which message 20 was received by terminal 12.

Also at step 140, the terminal 12 transmits synchronization message 21 to terminal 14 which is time stamped, network 40 reference time, with the time synchronization message 21 was transmitted. Using an internal clock, terminal 14 determines and stores the time, $T_{Prop}$, required for the synchronization message to propagate from terminal 12 to terminal 14.

Referring again to FIG. 4, at step 160, terminal 12 transmits message 16 via propagation path 19 to terminal 14. After being received by terminal 14 at step 180, message 16 is transformed at step 220 into message 26. Message 26 includes information that indicates the next time slot available for transmitting message 26 to network 46 or any other network, not shown, to which the message may be also addressed. As shown in FIG. 7, message 26 includes headers 26-1 through 26-5 some of which are encoded with information mapped and translated from the contents of headers 16-1 through 16-4 of message 16. Header 26-1 contains information provided directly by header 16-2. The contents of header 26-1 indicate the content of the message data field, i.e., text, binary, or mixed mode, copied from header 16-2. The contents of header 26-2 describes of the length of the data contained in message 26 which originated from header 16-1. However, the length of the data field, or message data, of message 26 may be derived from the contents of header 16-1. For example, header 16-1 may include information that describes a data field having ten 16-bit words; whereas header 26-3 includes information regarding the length of the data field of message 26, indicated in bytes. Therefore, the information in header 26-2 represents (2 bytes/16-bit word) X (10 words), which yields 20 bytes. The value "20" is then inserted into header 26-2. The contents of header 26-3 represent a unique network address group on network 46 having a similar type of address group on network 40. The value, $N_{Transmit}$ it stored in header 26-4 represents the next available time slot during which message 26 is to be transmitted by transmitter 44 so that it may be received by network 46. The value, $N_{Transmit}$ is determined by terminal 14, in part, from $N_{current}$, representing the current time slot of network 46, i.e., the presently active time slot of network 46. The variable $N_{Transmit}$ is determined as follows:

$$N_{current}=\text{int}[\text{mod}[[(T_{Diff}+T_{40})/P_{slot}]/S_{Epoch}]\times[S_{Epoch}]], \qquad (1)$$

where $P_{slot}$ is the period of the time slots comprising the epoch cycles of network 46, provided to terminal 14 from the predetermined network configuration load provided to terminal 14 by data storage 52. The parameter $S_{Epoch}$ represents the number of time slots per epoch cycle available on network 46, where each time slot has a period, $P_{slot}$. An epoch comprises a fixed number of discrete time slots during which messages may be transmitted or received, and is referenced to a time base of a particular network. A time base is a time standard used to schedule network operations. It is to be understood that the term "mod" in equation (1) represents a function such that mod[ABC.DEF]=0.DEF, and that the term "int" represents a function such that int [ABC.DEF]=ABC, where ABC.DEF and 0.DEF are decimal numbers and ABC is an integer. The epoch cycles repeat sequentially until network termination. The next available time slot, $N_{Transmit}$, for transmitting message 26 may be selected from a look-up table stored in terminal 14. The variable $N_{Transmit}$ it coincides with the earliest time slot in which to transmit message 26 so that it may be received by network 46 and satisfies the relation:

$$N_{current}<N_{Transmit}\leq S_{epoch}.$$

Still referring to FIG. 7, the information stored in header 26-5 represents the translation of the STN contained in header 16-3 so that the source track number (STN) in header 26-5 refers to the same discrete elements as does the STN value stored in header 20-3.

At step 250, the message 26 is generated by terminal 14 and provided to the transmitter 44 for subsequent transmission to the network 46. The process 100 then returns to step 102.

Terminals 12 and 14 may be programmed in accordance with well known techniques using any suitable computer language such as PASCAL, ADA, FORTRAN, C, AND C++ to achieve the above-referenced procedures in real time.

Obviously, many modifications and variations of the present invention are possible in light of the above teachings. It is therefore to be understood that within the scope of the appended claims, the invention may be practiced otherwise than as specifically described.

We claim:

1. A system for effectuating communications between non-time synchronized time division based networks, comprising:

a first terminal for receiving a first message having a first time characteristic, $T_1$, and for transmitting a second message in response to receiving the first message, where $T_1$ represents the time the first message was received by the first terminal, and for transmitting a synchronization message containing a first time base reference, $TB_1$, where $T_1$ is referenced to the first time base reference;

a second terminal for generating a third message in response to receiving the second message and the synchronization message, wherein the third message is encoded to represent a transmission time slot, $N_{Transmit}$, of an epoch cycle referenced to a second time base reference, $TB_2$, where the epoch cycle is comprised of an m number of time slots, m is a positive integer, and $N_{Transmit}$ is a function of $(TB_2-TB_1)$.

2. A system for effectuating communications between non-time synchronized time division based networks, comprising:

a first terminal for receiving a first message having a first time characteristic, $T_1$, and for transmitting a second message in response to receiving the first message, where $T_1$ represents the time the first message was received by the first terminal, and for transmitting a synchronization message containing a first time base reference, $TB_1$, where $T_1$ is referenced to the first time base reference;

a second terminal for generating a third message in response to receiving the second message and the synchronization message, wherein the third message is encoded to represent a transmission time slot, $N_{Transmit}$, of an epoch cycle referenced to a second time base reference, $TB_2$, where the epoch cycle is comprised of an m number of time slots, m is a positive integer, and $N_{Transmit}$ is a function of $(TB_2-TB_1)$;

wherein $N_{Transmit}$ is determined in accordance with the relations:

$$N_{current}=\text{int}[\text{mod}[[(T_{Diff}+T_1)/P_{slot}]/m]\times[m]], \text{ where}$$

$T_{Diff}=(TB_2-TB_1+T_{prop})$;

$T_{prop}$ is the time required for the synchronization message to propagate from the first terminal to the second terminal;

$P_{slot}$ is the period of the time slots comprising the epoch cycle; and where $N_{Transmit}$ satisfies the relation:

$$N_{current}<N_{Transmit}\leq m.$$

3. The system of claim 2 wherein said second message is generated by a time division based network.

4. The system of claim 2 further including a receiver for providing the first message to the first terminal.

5. The system of claim 2 further including a transmitter coupled to the second terminal for transmitting the third message in the transmission time slot.

6. The system of claim 2 further including a transceiver for providing the first message to the first terminal.

7. The system of claim 2 further including a data storage device for storing the third message and a transceiver coupled to the data storage device for transmitting the third message in the transmission time slot.

8. A method for effectuating communications between non-time synchronized time division based networks, comprising:

receiving a first message having a first time characteristic, $T_1$, and for transmitting a second message in response to receiving the first message, where $T_1$ represents the time the first message was received by a first terminal, where $T_1$ is referenced to a first time base reference, $TB_1$;

transmitting a synchronization message containing the time base reference $TB_1$;

generating a third message in response to receiving the second message and the synchronization message, wherein the third message is encoded to represent a transmission time slot, $N_{Transmit}$, of an epoch cycle referenced to a second time base reference, $TB_2$, where the epoch cycle is comprised of an m number of time slots, m is a positive integer, and $N_{Transmit}$ is a function of $(TB_2-TB_1)$.

9. A method for effectuating communications between non-time synchronized time division based networks, comprising:

receiving a first message having a first time characteristic, $T_1$, and for transmitting a second message in response to receiving the first message, where $T_1$ represents the time the first message was received by a first terminal, where $T_1$, is referenced to a first time base reference, $TB_1$;

transmitting a synchronization message containing the time base reference $TB_1$;

generating a third message in response to receiving the second message and the synchronization message, wherein the third message is encoded to represent a transmission time slot, $N_{Transmit}$, of an epoch cycle referenced to a second time base, $TB_2$, where the epoch cycle is comprised of an m number of time slots, m is a positive integer, and $N_{Transmit}$ is a function of $TB_1$ and $TB_2$; wherein $N_{Transmit}$ is determined in accordance with the relations:

$$N_{current}=\text{int}[\text{mod}[[(T_{Diff}+T_1)/P_{slot}]/m]\times[m]], \text{ where}$$

$T_{Diff}=(TB_2-TB_1+T_{prop})$;

$T_{prop}$ is the time required for the synchronization message to propagate from the first terminal to the second terminal;

$P_{slot}$ is the period of the time slots comprising the epoch cycle; and where $N_{Transmit}$ satisfies the relation:

$$N_{current}<N_{Transmit}\leq m.$$

10. The method of claim 9 further including the step of transmitting said third message in said transmission time slot.

* * * * *